(12) United States Patent
Cornelissen et al.

(10) Patent No.: US 9,499,343 B2
(45) Date of Patent: Nov. 22, 2016

(54) CONVEYING SYSTEM, AND USE OF A CHAMBER EXTENDING INWARDLY WITH RESPECT TO A PLASTIC MODULE IN A CONVEYING SYSTEM

(75) Inventors: Leonardus Adrianus Catharinus Cornelissen, 's-Gravenhage (NL); Ronald Sigmond, Schiedam (NL)

(73) Assignee: REXNORD FLATTOP EUROPE B.V., 'S-Gravenzande (NL)

(*) Notice: Subject to any disclaimer, the term of this patent is extended or adjusted under 35 U.S.C. 154(b) by 256 days.

(21) Appl. No.: 14/005,496

(22) PCT Filed: Mar. 16, 2012

(86) PCT No.: PCT/NL2012/050163
§ 371 (c)(1),
(2), (4) Date: Dec. 17, 2013

(87) PCT Pub. No.: WO2012/128621
PCT Pub. Date: Sep. 27, 2012

(65) Prior Publication Data
US 2015/0307282 A1    Oct. 29, 2015

(30) Foreign Application Priority Data
Mar. 18, 2011 (NL) ............................ 2006418

(51) Int. Cl.
*B65G 47/00* (2006.01)
*B65G 17/08* (2006.01)
*B65G 17/40* (2006.01)

(52) U.S. Cl.
CPC .............. *B65G 17/08* (2013.01); *B65G 17/40* (2013.01)

(58) Field of Classification Search
CPC ................................. B65G 17/08; B65G 17/40

USPC ............. 198/617, 844.1, 850, 851, 853; 474/202, 206, 207, 212–217
See application file for complete search history.

(56) References Cited

U.S. PATENT DOCUMENTS

| 1,529,243 | A | | 3/1925 | Drake et al. |
| 4,747,261 | A | | 5/1988 | Frenker-Hackfort |
| 4,951,457 | A | | 8/1990 | Deal |
| 5,613,597 | A | * | 3/1997 | Palmaer ............... B65G 17/086 198/853 |

(Continued)

FOREIGN PATENT DOCUMENTS

| EP | 0 201 317 A2 | 11/1986 |
| EP | 0459104 A1 | 12/1991 |
| NL | 2 002 344 C | 6/2010 |

OTHER PUBLICATIONS

International Search Report dated Jun. 27, 2012, 2012 in connection with PCT/NL2012/050163.

*Primary Examiner* — William R Harp
(74) *Attorney, Agent, or Firm* — Quarles & Brady LLP (57) ABSTRACT

The invention relates to a conveying system. The conveying system comprises a conveying track, an endless conveyor mat for conveying products in a conveying direction, a drive for driving the conveyor mat, and a return guide provided at the conveying track for guiding the conveyor mat upon circulation. The return guide extends substantially transversely to the conveying direction. The conveyor mat comprises a number of plastic modules, which are provided at their bottom side with a track guide surface, while at least a part of the plastic modules at the location of the respective track guide surface comprise at least one chamber extending inwardly with respect to the module for being in a contact with the return guide during circulation of the module around the return guide. The chamber is formed such that the contact upon circulation consists of a first line contact and a second line contact.

13 Claims, 4 Drawing Sheets

(56) References Cited

U.S. PATENT DOCUMENTS

| | | | |
|---|---|---|---|
| 6,196,381 B1 * | 3/2001 | Kato | B65G 17/08 198/851 |
| 6,213,292 B1 * | 4/2001 | Takahashi | B65G 17/08 198/851 |
| 6,367,619 B1 * | 4/2002 | Cemke, Jr. | B65G 47/66 198/837 |
| 7,624,858 B2 * | 12/2009 | Delair | B65G 17/40 198/778 |
| 7,712,298 B1 | 5/2010 | Wang | |
| 2008/0314720 A1 | 12/2008 | Guldenfels et al. | |
| 2009/0159407 A1 | 6/2009 | Delair et al. | |

* cited by examiner

CONVEYING SYSTEM, AND USE OF A CHAMBER EXTENDING INWARDLY WITH RESPECT TO A PLASTIC MODULE IN A CONVEYING SYSTEM

CROSS-REFERENCE TO RELATED APPLICATIONS

This application represents the national stage entry of PCT International Application No. PCT/NL2012/050163 filed on Mar. 16, 2012 and claims the benefit of Netherlands patent application no. 2006418 filed Mar. 18, 2011. The content of each of these applications is hereby incorporated by reference as if set forth in its entirety herein.

STATEMENT REGARDING FEDERALLY SPONSORED RESEARCH OR DEVELOPMENT

Not applicable.

FIELD OF THE INVENTION

The invention relates to a conveying system, comprising a conveying track, an endless conveyor mat designed to circulate around the conveying track and suitable for conveying products in a conveying direction, a drive for driving the conveyor mat, and a non-driving return guide provided at the conveying track for guiding the conveyor mat upon circulation, which return guide extends substantially transversely to the conveying direction, wherein the conveyor mat comprises a number of plastic modules successive in conveying direction, extending transversely to the conveying direction, which, viewed in conveying direction, are each provided at their front and rear side with hinge loops, and wherein the hinge loops of modules successive in conveying direction cooperate and are coupled with the aid of hinge pins extending transversely to the conveying direction, wherein the plastic modules, at their side located at their bottom side when the modules are guided over the track, are provided with a track guide surface, while at least a part of the plastic modules comprise at the location of the respective track guide surface at least one chamber extending inwardly with respect to the module for being in a contact with the return guide during circulation of the module around the return guide.

BACKGROUND OF THE INVENTION

Such conveying systems are known and are utilized for conveying all sorts of products in a large number of different environments. Often, the known systems have mats which are built up from plastic modules which usually have inwardly extending chambers with a concave, circular cylindrical surface, while a radius of the concave, circular cylindrical surface substantially corresponds to a radius of a return guide of the conveying system, so that the chamber, when circulating around the return guide, fits snugly on the return guide.

Different variants of the known systems are on the market, which are provided with substantially roller-shaped, often rotatably disposed, return guides with different radii. For instance, a first known system has a return guide with a radius of approximately 50 mm and modules with inwardly extending chambers with a radius of approximately 50 mm, and a second known system has a return guide with a radius of approximately 60 mm and modules with inwardly extending chambers with a radius of approximately 60 mm.

Also, systems are known having at least one return guide, wherein the at least one return guide is not rotatably disposed. Such return guides are often nose-shaped, instead of roller-shaped, and comprise substantially circular cylindrical guide surfaces for guiding plastic modules of a conveyor mat.

A drawback of the known systems is that when the modules of the mat are worn, the mat has to be replaced by a mat with modules having chambers with concave, circular cylindrical surfaces that correspond to the radii of a guide surface of the return guides.

When a supplier of conveyor mats wishes to deliver to users of different variants of the known systems, the supplier must be able to supply different mats with different modules. This has as a drawback, for example, that at suppliers, this may lead to large stocks consisting of many different modules and mats. Further, this may for instance lead to longer delivery times in that a supplier does not have the proper modules and/or mats in stock, and/or in that the logistics have thereby become complex. This is not desirable because it may, for instance, cause a production line, of which the conveying system forms a part, to remain out of use for a long period of time. It is also a drawback that a manufacturer of plastic modules, for the production of different modules with chambers of different dimensions, has to invest in different production means, such as different injection molding molds for the different modules with chambers of different dimensions. This can also lead to large stocks at the manufacturer's and/or in the distributive trade and, for instance, the delivery times from the manufacturer to one of his buyers can become longer.

SUMMARY OF THE INVENTION

An object of the invention is to provide a conveying system which solves or reduces one or more of the above-mentioned problems. The stated object is achieved with the conveying system of the type mentioned in the opening paragraph, which is characterized in that the chamber is formed such that the contact upon circulation consists of a first line contact and a second line contact.

By forming the chamber such that during circulation of the module around the return guide the contact between the chamber and the return guide consists of two line contacts, the chamber of the module, when the module circulates around the return guide, is in contact with the return guide at two contact lines, so that in cooperation with return guides of different diameters, a stable travel can be achieved.

It is noted that the line contacts extend substantially in the longitudinal direction of the return guide. Further, the line contacts are substantially transverse to the conveying direction, and are spaced apart in conveying direction.

As the chamber of the plastic module, during circulation of the module around the return guide, is in contact with the return guide just over two contact lines, it can be achieved that the module is properly guided. A shape other than a substantially circular cylindrical shape corresponding substantially to a portion of the surface of the return guide can be chosen for the chamber, as long as the shape other than a substantially circular cylindrical shape is chosen such that, during circulation of the module around the return guide, the contact between the chamber and return guide can consist of two line contacts. This renders it possible to provide a module with a chamber which, with different return guides, such as for instance different circular cylindrical return guides having different radii, makes contact along two contact lines. Thus, it is achieved that when, in an existing conveying system, the modules of an existing mat are worn, and the mat is to be replaced, the worn mat can be replaced by a mat with modules that do not need to have chambers with concave, circular cylindrical surfaces corresponding, for instance, to the specific radius of the specific circular cylindrical return guide(s) of the existing conveying system. The fact is that the mat can be replaced by a mat with modules having chambers so formed that the contact between the chamber and the return guide during circulation around the return guide consists of a first line contact and a second line contact. Thus, it is achieved, inter alia, that a supplier of conveyor mats who wants to supply users of different variants of the known conveying systems, does not need to have different plastic modules and/or different mats in stock, but merely modules and/or mats with modules having chambers so formed that the contact consist of a first line contact and a second line contact.

Once again, it is noted that the return guide does not necessarily need to be substantially circular cylindrical in shape. The return guide can also be, for instance, semicircular cylindrical, or the return guide may have, for instance, a non-round, convex shape, such as, for instance, a parabolically or elliptically curved convexity. Alternatively or additionally, the return guide can also be chiefly built up from substantially flat surface parts, for instance, the cross section of the return guide in a plane transverse to the longitudinal direction of the return guide can be, for instance, a polygon. Furthermore, it may be that the return guide is fixedly connected to the conveying track but, alternatively, the return guide can also be rotatably connected, which can be advantageous, for instance, in the case of a substantially circular cylindrical return guide.

By spacing apart the two line contacts in the conveying direction, it can be achieved that the module can circulate around the return guide in a stable manner. As the module runs onto the return guide, a first line contact between the chamber and the return guide can come about. When, thereupon, the module runs onto the return guide further, a second line contact, located at a distance from the first line contact, can come about and circulation around the return guide can start. After the, at least partial, circulation, the first line contact can be undone and the module can run off the return guide. As the plastic module runs off the return guide, it may be there is a second line contact between the return guide and the chamber of the plastic module, while there is no first line contact.

Also, during circulation of the plastic module around the return guide, the first line contact and the second line contact can both be situated, in conveying direction, between a first linkup, extending substantially transversely to the conveying direction, of the track guide surface with the inwardly extending chamber, and a second linkup, extending transversely to the conveying direction, of the track guide surface with the inwardly extending chamber. As a result, inter alia a stable travel can be achieved. The contact lines on which the contact between the chamber and the return guide may be situated, can therefore be at a distance from the beginning of the chamber. Therefore, the contact lines can be situated in the chamber, so that a stable travel can be achieved.

That the contact between the chamber and the return guide during circulation consists of a first line contact and a second line contact can be effected by having a first surface part of the chamber, formed by the module, on which the first line contact can be situated, extend substantially in the direction of a second surface part of the chamber, formed by the module, on which the second line contact can be situated. The first and the second surface part can extend towards each other in directions inward with respect to the module. The first surface part and/or the second surface part can be a substantially flat surface part. If the first and the second surface parts are both substantially flat surface parts, the two surface parts can be at an angle to each other. The angle can be, for example, between 0' and 90'.

However, it may also be that the first surface part and/or the second surface part is a convex surface part, or even a concave surface part. It is noted here that the convex, or the concave, surface part, respectively, can be seen as, respectively, a part curving convexly or a part curving concavely with respect to the chamber, of a surface of the plastic module delimiting the chamber. Preferably, a concave or convex surface part is single-curved, and so lines on the concave or convex surface part of the return guide that run parallel to the longitudinal direction of the return guide preferably extend in a straight, noncurved line. In the case where the first and/or the second surface part is a concave surface part, the curvature of the concave surface part is preferably smaller than the curvature of the surface of the return guide, and preferably even considerably smaller than the curvature of the surface of the return guide.

The first surface part and the second surface part can link up with each other there where the surface parts intersect, cross and/or contact each other, while the tangent line, cross line and/or intersecting line is substantially transverse to the conveying direction and runs substantially parallel to a longitudinal axis of the return guide. Alternatively, the first surface part and the second surface part can be connected with each other by one intermediate surface part or a plurality of intermediate surface parts. An intermediate surface part can then be flat, convex or concave. As, during circulation, the return guide preferably does not make contact with an intermediate surface part, an intermediate convex or concave surface part can be a double-curved surface part. It is noted that the intermediate convex or concave surface part, however, can also be a single-curved surface part.

As, during the circulation of the plastic module around the return guide, the first line contact and the second line contact are situated in the chamber, and, for instance, are not situated on the boundary line of the track guide surface and the chamber, but are situated between the track guide surface and a top surface of the module, a stable travel can be obtained. The track guide surface and the contact lines, on which, during circulation, the contact between the chamber and the return guide is situated, are therefore spaced apart with an intermediate distance.

BRIEF DESCRIPTION OF THE DRAWINGS

The invention will be further elucidated on the basis of exemplary embodiments which are represented in the drawings. In the drawings.

The Figures are only schematic representations of preferred embodiments of the invention, which are given by way of non-limiting exemplary embodiments. In the Figures, identical or corresponding parts are indicated with the same reference numerals.

DETAILED DESCRIPTION OF THE EXAMPLE EMBODIMENTS

Figure 1:
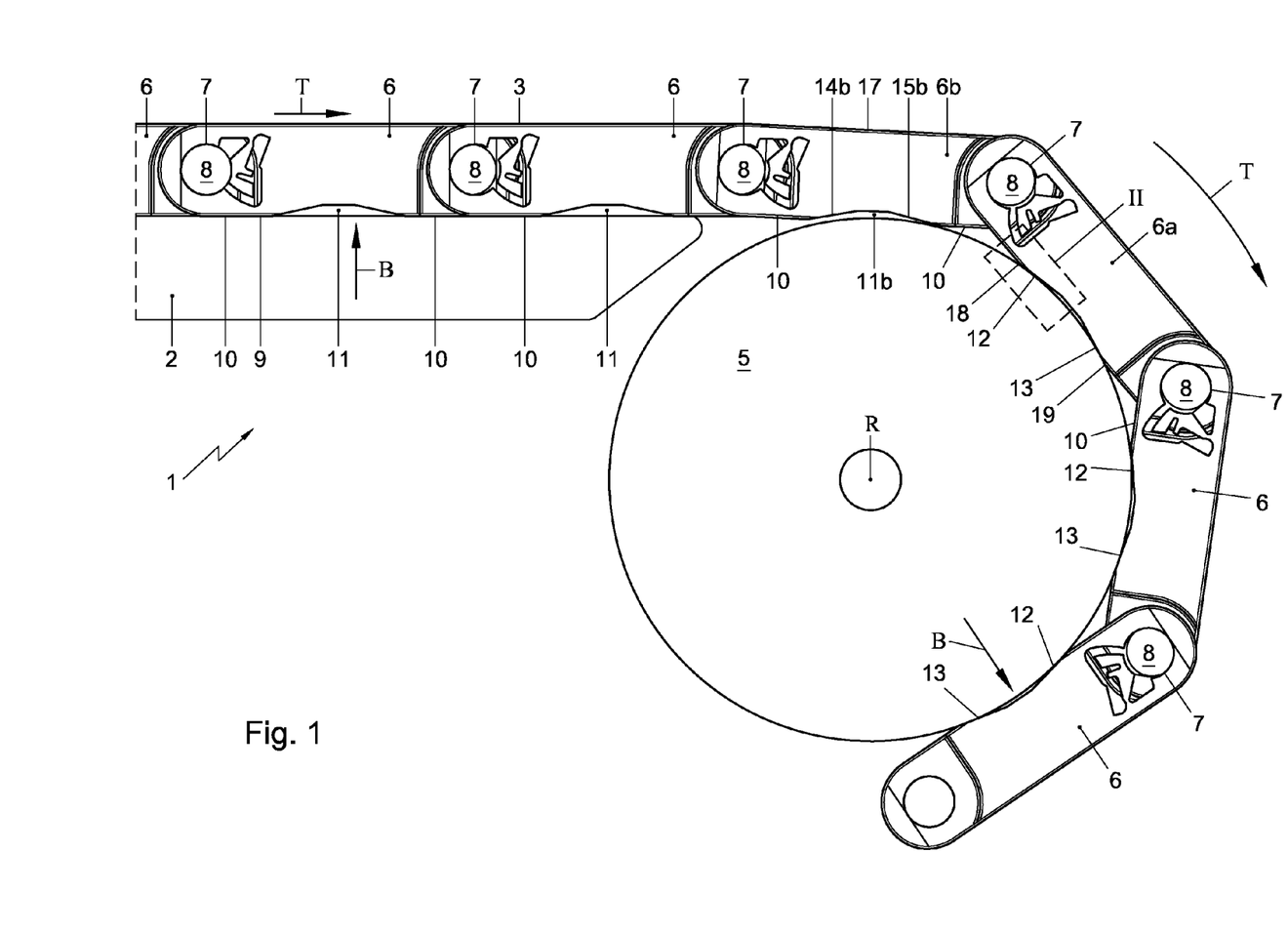
FIG. 1 shows a schematic cross section of a part of the conveying system according to the invention.

FIG. 1 shows a schematic cross section of a part of a conveying system 1 according to the invention. The conveying system 1 comprises a conveying track 2, an endless conveyor mat 3 designed to circulate around the conveying track 2 and suitable for conveying products in the conveying direction T, a drive (not shown) for driving the conveyor mat 3, and a nondrying return guide 5 provided on the conveying track 2 for guiding the conveyor mat 3 upon circulation thereof. The return guide 5 extends substantially transversely to the conveying direction T. The conveyor mat 3 comprises a number of plastic modules 6 successive in conveying direction T and extending transversely to the conveying direction T, which, viewed in conveying direction T, are each provided at their front and rear side with hinge loops 7. The hinge loops 7 of modules 6 successive in conveying direction T cooperate and are coupled with the aid of hinge pins 8 extending transversely to the conveying direction T. The plastic modules 6, at their side 9 located at their bottom side when the modules 6 are guided over the track 2, are provided with a track guide surface 10, while at least a part of the plastic modules 6 comprise, at the location of the respective track guide surface 10, at least one chamber 11 extending inwardly with respect to the module, for being in a contact with the return guide 5 during circulation of the module 6 around the return guide 5. The chamber 11 is formed such that the contact during circulation consists of a first line contact 12 and a second line contact 13.

The return guide 5 can for instance be a roller 5 or comprise a roller 5. The roller 5 can here have a diameter of, for instance, 50 mm. Other roller diameters are also possible, for instance 60 mm. The roller 5 can be rotatably fastened to the track 2, while the rotation axis R of the roller 5 can be substantially transverse to the conveying direction T.

It is noted that the return guide 5 need not be rotatably fastened to the track 2, but can also be fastened substantially non-pivotally. Also, the return guide 5 can have a different shape than a substantially circular cylindrical shape. For instance, the return guide 5 may be nose-shaped, while, for instance, only, or at least, the portion of the return guide 5 with which the chamber(s) 11 is/are in contact when the module(s) 6 circulate(s) around the track 2, can have a convex surface. It is further noted that the conveying system 1 of the conveying apparatus can comprise several return guides 5. Thus, the track 2 can for instance comprise two lateral ends, which can both be provided with a return guide 5. Alternatively or additionally, on one of the lateral ends of the track 2, for instance, several return guides 5 can be placed, preferably substantially in line with each other.

Figure 2:
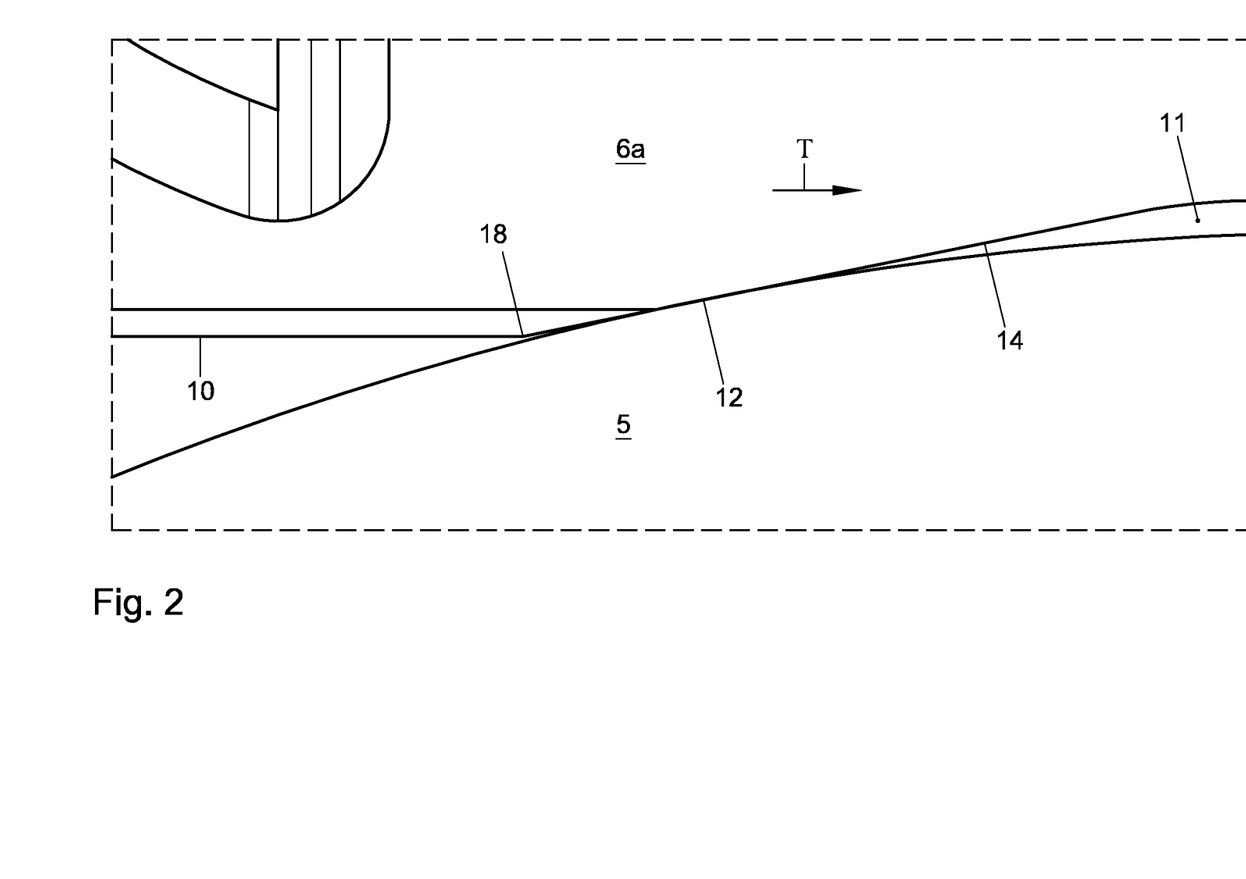
FIG. 2 shows a detail of the part of the conveying system of FIG. 1.

The two line contacts 12, 13 extend in longitudinal direction of the return guide 5. Further, the two contact lines 12, 13 are substantially transverse to the conveying direction T. This means that the line contacts 12, 13 of the exemplary embodiment shown in FIGS. 1 and 2 are perpendicular to the plane of the paper. Therefore, the line contacts 12, 13 are represented as dots 12, 13. As shown in FIGS. 1 and 2, the line contacts are spaced apart in conveying direction: between the dots an intermediate space is visible. The two line contacts 12, 13 can be spaced apart in the conveying direction T. By spacing apart the two line contacts 12, 13, a stable travel can be obtained. Also when the return guide 5 is, for instance, of nose-shaped design, whereby, for instance, the portion of the return guide 5 that the chambers 11 contact during circulation of the modules 6 around the track 2 has a convex surface, the two line contacts 12, 13 are spaced apart during circulation. Just as in the embodiment with a substantially roller-shaped return guide 5, also in the embodiment with the nose-shaped return guide 5, the spaced-apart line contacts 12, 13 provide a relatively stable travel.

FIG. 2 shows a detail II of the portion of the conveying system 1 of FIG. 1. As the detail II of FIG. 1 is enlarged, it is clearer that during circulation, contact between the return guide 5 and the plastic module 6 comprises a first line contact 12.

In an advantageous embodiment, the first line contact 12 is on a first surface part 14 of the chamber 11, formed by the module, and the second line contact 13 is on a second surface part 15 of the chamber 11, formed by the module.

As the plastic module 6b runs onto the return guide 5, a contact can come about between the module 6b and the return guide 5. Contact can initially consist of a first line contact, which first line contact can for instance extend over a contact line where the track guide surface 10 touches the return guide. As the plastic module 6b runs further onto the return guide 5, the contact line can shift over the track guide surface 10 in the direction of the chamber 11b. As the plastic module 6b thereupon runs onto the return guide 5 still further, the contact line can move to a position on the second surface part 15b, hence, to a position in the chamber 11b. Thereupon, the contact line in the chamber 11b can shift increasingly further inwards over the second surface part 15b, until the first contact surface 14b also contacts the return guide 5. From the moment the module 6 has run onto the return guide 5 and so two line contacts 12, 13 have come about (one between the first surface part 14 and the return guide 5 and one between the second surface part 15 and the return guide 5), the module 6 can circulate around the return guide 5. Further, it is possible that during circulation the contact lines over which the line contacts 12, 13 between the module and the return guide 5 extend can still move relative to the contact surfaces 14, 15 in the chamber 11. From the moment the second line contact 13 is lost and the module 6 has only one line contact, viz., the first line contact 12, with the return guide 5, the plastic module 6 runs off the return guide 5. As it runs off, the first line contact 12 can move over the first contact surface 14. Further, the line contact 12 can also move from the chamber 11 to the track guide surface 10 and the line contact 12 can also move over track guide surface 10.

From the moment the first line contact 12 is lost and so there is no contact anymore between the module 6 and the return guide 5, the module 6 has run off of the return guide 5. The module can thereupon be passed under the track and thereupon, possibly at the other lateral end of the track 2, for instance via a second return guide, be brought to the upper side of the track 2 again. Then, the module 6 can once again be passed in the conveying direction T towards the first return guide 5, where the module 6 can run onto, circulate around and run off the first return guide 5 again.

Figure 3:
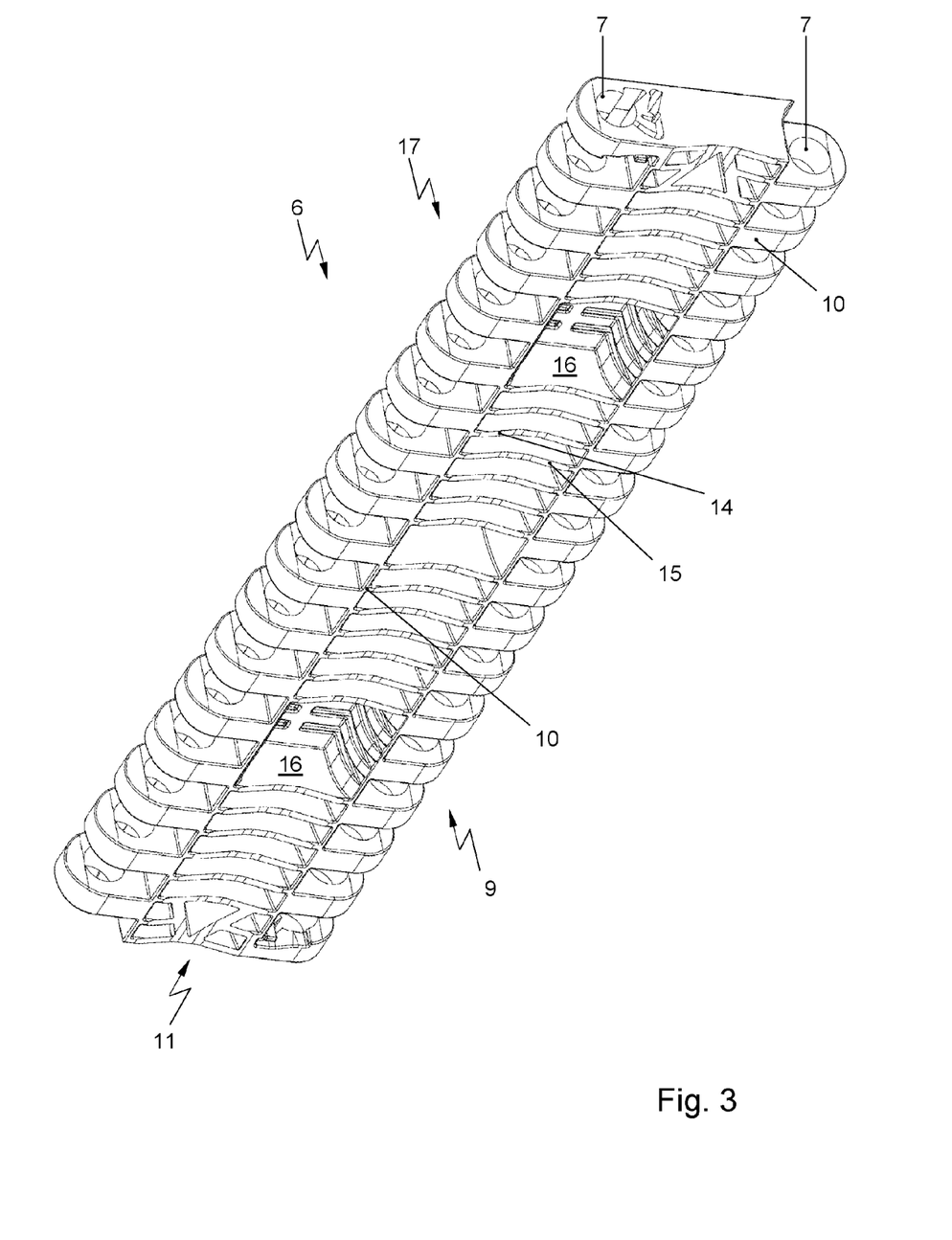
FIG. 3 shows a schematic perspective view of a first embodiment of a plastic module of a conveying system according to the invention.

FIG. 3 shows a schematic perspective view of a first embodiment of a plastic module 6 of a conveying system according to the invention. The module 6 can comprise, for instance, one or more cavities 16 in which drive means can engage for advancing the conveyor mat 3 in conveying direction T. It is noted that the module 6 can also be driven in an alternative manner, as, for instance, with the aid of a gear transmission or by means of a contactless drive, for instance, with the aid of magnets.

FIGS. 4a-4d show different embodiments of chambers 11 of a plastic module 6 of a conveying system according to the invention. In the embodiments shown, the chamber 11, viewed in conveying direction T, is located substantially centrally between the hinge loops 7 provided at the front and rear side of the module 6. Alternatively, the chamber 11, viewed in conveying direction T, can be placed further forward or, conversely, further rearwards.

Figure 4A:
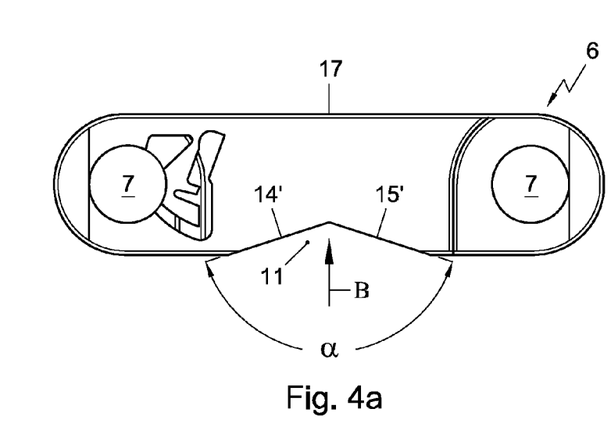
FIG. 4a shows a schematic view of a second embodiment of a plastic module of a conveying system according to the invention.

FIG. 4a shows a schematic view of a second embodiment of a plastic module 6 of a conveying system according to the invention. The first surface part 14 and the second surface part 15 converge substantially in a direction B inward with respect to the circulating module 6.

The first surface part 14 can be a first substantially flat surface part 14' and the second surface part 15 can be a second substantially flat surface part 15', with the two flat surface parts 14', 15' being at a mutual angle a. The angle a is between 0' and 90'.

Further, the first surface part 14 and the second surface part 15 can link up with each other in a roof-shaped manner. As the first and the second surface part in FIG. 4a link up with each other at an angle a, a roof-shaped, triangular prismatic chamber 11 is obtained.

Figure 4B:
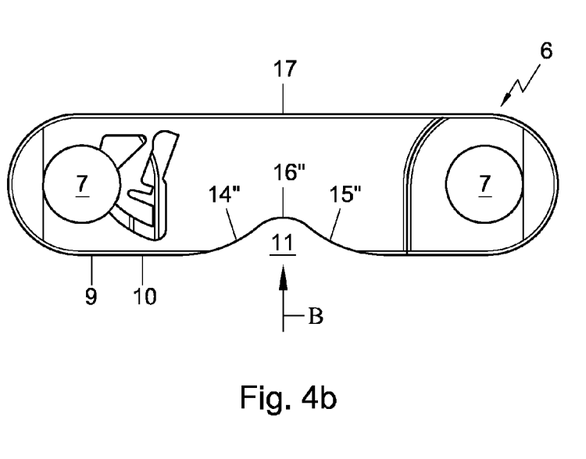
FIG. 4b shows a schematic view of a third embodiment of a plastic module of a conveying system according to the invention.

FIG. 4b shows a schematic view of a third embodiment of a plastic module 6 of a conveying system according to the invention. The first surface part 14 is a first convex surface part 14" and the second surface part 15 is a second convex surface part 15". The first surface part 14" and the second surface part 15" are connected by one intermediate concave surface part 16". Alternatively, the intermediate surface part 16 can also be a flat surface part 16 or a convex surface part 16.

It is noted that the first surface part 14 and the second surface part 15 may alternatively be connected to each other by several intermediate surface parts 16. Each intermediate surface part 16 can be a flat surface part 16', as shown in FIG. 4c, a concave surface part 16", as shown in FIG. 4b, or a convex surface part 16'''.

Figure 4C:
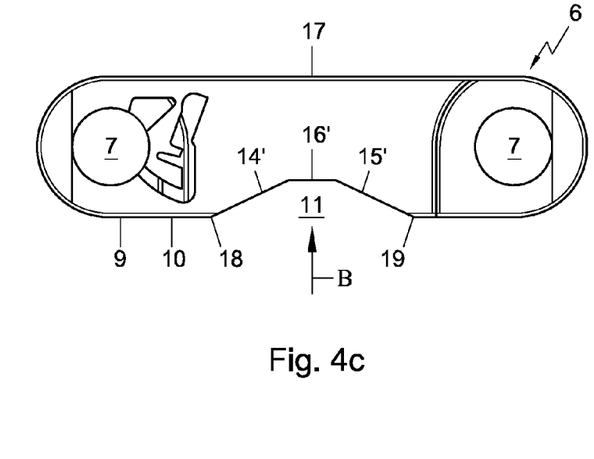
FIG. 4c shows a schematic view of a fourth embodiment of a plastic module of a conveying system according to the invention.

FIG. 4c shows a schematic view of a fourth embodiment of a plastic module 6 of a conveying system according to the invention. In this embodiment, just as in the embodiment of FIGS. 1-3, the first surface part 14' is connected to the second surface part 15' by means of a connecting surface 16' extending substantially parallel to the track guide surface.

Figure 4D:
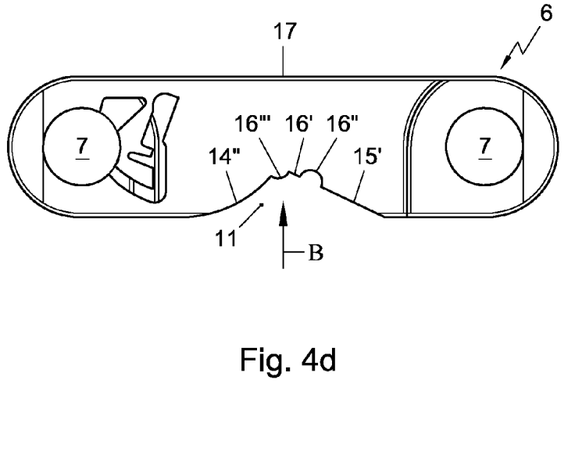
FIG. 4d shows a schematic view of a fifth embodiment of a plastic module of a conveying system according to the invention.

It is noted that the first and the second surface part 14, 15 do not need to have the same shape. For instance, the first surface part 14 can be convex and the second surface part 15 can be substantially flat. FIG. 4d shows a schematic view of a fifth embodiment of a plastic module 6 of a conveying system according to the invention. In this exemplary embodiment, the first surface part 14 is a convex surface part 14''' and the second surface part 15 is a flat surface part 15'. Both surface parts 14, 15 are connected to each other by several intermediate surface parts 16', 16", 16'''.

In an advantageous embodiment, both the first line contact 14 and the second line contact 15, during the circulation of the module 6 around the return guide 5, are between the track guide surface 10 and an upper surface 17 of the module 6. As the line contacts are located above the track guide surface 10, a stable travel can be achieved.

In a further advantageous embodiment, both the first line contact 12 and the second line contact 13, during the circulation of the module 6 around the return guide 5, are located in conveying direction T between a first linkup 18, extending transversely to the conveying direction, of the track guide surface 10 with the inwardly extending chamber 11 and a second linkup 19, extending transversely to the conveying direction, of the track guide surface 10 with the inwardly extending chamber 11. In FIG. 2, it can be seen that the first line contact 12 (represented as a dot) is located in the chamber 11, i.e., the first line contact 12 is located between the first and the second linkup 18, 19 extending transversely to the conveying direction, and that the first line contact 12 is at a distance from the track guide surface 10.

The invention is not limited to the exemplary embodiments described here. Many variants are possible. Such variants will be clear to the skilled person and are understood to fall within the scope of the invention, as set forth in the following claims.

The invention claimed is:

1. A conveying system, comprising:
   a conveying track;
   an endless conveyor mat designed to circulate around the conveying track and suitable for conveying products in a conveying direction;
   a drive for driving the conveyor mat; and
   a non-driving return guide provided at the conveying track for guiding the conveyor mat upon circulation, which return guide extends substantially transversely to the conveying direction,
   wherein the conveyor mat comprises a number of plastic modules successive in the conveying direction, extending transversely to the conveying direction, which, each module viewed in the conveying direction having front and rear sides joined by a bottom side, are each provided at their front and rear sides with hinge loops, and wherein the hinge loops of modules successive in the conveying direction cooperate and are coupled with the aid of hinge pins extending transversely to the conveying direction, wherein the plastic modules, at their side located at their bottom side when the modules are guided over the track, are provided with a track guide surface, while at least a part of the plastic modules comprise, at a location of the respective track guide surface, at least one chamber extending inwardly with respect to the module for being in a contact with the return guide during circulation of the module around the return guide, the chamber being formed such that contact upon circulation consists of a first line contact and a second line contact.

2. A conveying system according to claim 1, in which the two line contacts are spaced apart in the conveying direction.

3. A conveying system according to claim 1, in which the first line contact is situated on a first surface part of the chamber formed by the module and the second line contact is situated on a second surface part of the chamber formed by the module.

4. A conveying system according to claim 3, in which the first surface part and the second surface part substantially converge in an inward direction with respect to the circulating module.

5. A conveying system according to claim 3, in which the first surface part is a first substantially flat surface part and the second surface part is a second substantially flat surface part, while the two flat surface parts are at an angle to each other.

6. A conveying system according to claim 3, in which the first surface part is a first convex surface part and the second surface part is a second convex surface part.

7. A conveying system according to claim 3, in which the first surface part is convex and the second surface part is substantially flat.

8. A conveying system according to claim 3, in which the first surface part and the second surface part link up with each other in a roof-shaped manner.

9. A conveying system according to claim 3, in which the first surface part and the second surface part are connected to each other by one or more intermediate surface parts.

10. A conveying system according to claim 1, in which during circulation of the module around the return guide, the first line contact and the second line contact are both situated between the track guide surface and a top surface of the module.

11. A conveying system according to claim 1, in which during circulation of the module around the return guide, the first line contact and the second line contact are both situated in conveying direction between a first linkup extending transversely to the conveying direction of the track guide surface with the inwardly extending chamber and a second linkup extending transversely to the conveying direction of the track guide surface with the inwardly extending chamber.

12. A method of using a conveying system, said method comprising:

circulating a number of plastic modules successive in a conveying direction on a track, said modules extending transversely to the conveying direction, which, each module viewed in the conveying direction having front and rear sides joined by a bottom side, are each provided at their front and rear sides with hinge loops, and wherein the hinge loops of modules successive in the conveying direction cooperate and are coupled with the aid of hinge pins extending transversely to the conveying direction, wherein the plastic modules, at their side located at their bottom side when the modules are guided over the track, are provided with a track guide surface, while at least a part of the plastic modules comprise, at a location of the respective track guide surface, at least one chamber extending inwardly with respect to the module for being in a contact with the return guide during circulation of the module around the return guide, the at least one chamber being formed such that contact upon circulation consists of a first line contact and a second line contact; and contacting the at least one inwardly extending chamber with the return guide during circulation of the plastic module.

13. The method according to claim 12, in which the plastic modules are provided, viewed in conveying direction, at front and rear sides with hinge loops, for cooperation with hinge loops of a module respectively following or preceding in conveying direction, said method including coupling each of said modules to other of said modules with the aid of hinge pins extending transversely to the conveying direction through said hinge loops.

* * * * *